United States Patent
Farrell

(10) Patent No.: US 9,393,462 B2
(45) Date of Patent: Jul. 19, 2016

(54) GOLF BALL WITH THIN MOISTURE VAPOR BARRIER LAYER

(71) Applicant: Acushnet Company, Fairhaven, MA (US)

(72) Inventor: John D. Farrell, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 15 days.

(21) Appl. No.: 14/319,200

(22) Filed: Jun. 30, 2014

(65) Prior Publication Data

US 2015/0375062 A1    Dec. 31, 2015

(51) Int. Cl.
| | |
|---|---|
| *A63B 37/00* | (2006.01) |
| *A63B 45/00* | (2006.01) |
| *B32B 9/00* | (2006.01) |

(52) U.S. Cl.
CPC ......... *A63B 37/0093* (2013.01); *A63B 37/0022* (2013.01); *A63B 37/0033* (2013.01); *A63B 37/0039* (2013.01); *A63B 37/0045* (2013.01); *A63B 37/0064* (2013.01); *A63B 37/0075* (2013.01); *A63B 45/00* (2013.01); *B32B 9/007* (2013.01)

(58) Field of Classification Search
None
See application file for complete search history.

(56) References Cited

U.S. PATENT DOCUMENTS

| | | | |
|---|---|---|---|
| 5,820,488 A | 10/1998 | Sullivan et al. | |
| 5,875,891 A | 3/1999 | Snell | |
| 5,885,172 A | 3/1999 | Hebert et al. | |
| 6,132,324 A | 10/2000 | Hebert et al. | |
| 6,806,347 B2 | 10/2004 | Hogge et al. | |
| 7,025,696 B2 | 4/2006 | Sullivan et al. | |
| 7,220,191 B2 * | 5/2007 | Onoda | A63B 37/0003 473/351 |
| 7,357,733 B2 | 4/2008 | Hogge et al. | |
| 2013/0150516 A1 * | 6/2013 | Lettow | C08K 3/04 524/495 |

FOREIGN PATENT DOCUMENTS

WO    WO-2013/083999    *    6/2013

OTHER PUBLICATIONS

Yoo, Graphene and Graphene Oxide and Their Uses in Barrier Polymers; Journal of Applied Polymer Science vol. 131 issue 1 Aug. 2, 2013 pp. 1-23.*
PORON Industrial Materials; Compression Force Deflection Versus Shore Hardness data sheet; 2001.*
Bend it, Charge it, Dunk it: Graphene, the Material of Tomorrow; Nick Bilton; New York Times; Apr. 13, 2014.

* cited by examiner

*Primary Examiner* — David Buttner
(74) *Attorney, Agent, or Firm* — Kristin D. Wheeler

(57) ABSTRACT

A golf ball comprising a core, a cover and at least one moisture vapor barrier layer, wherein the moisture vapor barrier layer comprises at least one layer formed from graphene.

16 Claims, 3 Drawing Sheets

GOLF BALL WITH THIN MOISTURE VAPOR BARRIER LAYER

FIELD OF THE INVENTION

The present invention relates to a novel structure for a golf ball, and more particularly, to a golf ball with a moisture vapor barrier layer.

BACKGROUND OF THE INVENTION

Solid core golf balls are well known in the art. Typically, the core is made from polybutadiene rubber material, which provides the primary source of resiliency for the golf ball. U.S. Pat. Nos. 3,241,834 and 3,313,545 disclose the early work in polybutadiene chemistry. It is also known in the art that increasing the cross-link density of polybutadiene can increase the resiliency of the core. The core is typically protected by a cover from repeated impacts from golf clubs. The golf ball may comprise additional layers, which can be an outer core or an inner cover layer.

A known drawback of polybutadiene cores cross-linked with peroxide and/or zinc diacrylate is that this material is adversely affected by moisture. Water moisture vapor reduces the resiliency of the cores and degrades its properties. A polybutadiene core will absorb water and loose its resilience. Thus, these cores must be covered quickly to maintain optimum ball properties. The cover is typically made from ionomer resins, balata, and urethane, among other materials. The ionomer covers, particularly the harder ionomers, offer some protection against the penetration of water vapor. However, it is more difficult to control or impart spin to balls with hard covers. Conventional urethane covers, on the other hand, while providing better ball control, offer less resistance to water vapor than ionomer covers.

Prolonged exposure to high humidity and elevated temperature may be sufficient to allow water vapor to invade the cores of some commercially available golf balls. For example, at 110° F. and 90% humidity for a sixty day period, significant amounts of moisture enter the cores and reduce the initial velocity of the balls by 1.8 ft/s to 4.0 ft/s or greater. The change in compression may vary from 5 PGA to about 10 PGA or greater. The absorbed water vapor also reduces the coefficient of restitution (CoR) of the ball. When a golf ball is subjected to prolonged storage and/or use under ambient conditions such as 25-35% RH, as well as conditions of high temperature and high humidity, the COR of the golf ball tends to decrease over time due to water vapor absorption.

Several prior patents have addressed the water vapor absorption problem. U.S. Pat. No. 5,820,488 discloses a golf ball with a solid inner core, an outer core and a water vapor barrier layer disposed there between. The water vapor barrier layer preferably has a water vapor transmission rate lower than that of the cover layer. The water vapor barrier layer can be a polyvinylidene chloride (PVDC) layer. It can also be formed by an in situ reaction between a barrier-forming material and the outer surface of the core. Alternatively, the water vapor barrier layer can be a vermiculite layer. U.S. Pat. Nos. 5,885,172 and 6,132,324 disclose, among other things, a golf ball with a polybutadiene or wound core with an ionomer resin inner cover and a relatively soft outer cover. The hard ionomer inner cover offers some resistance to water vapor penetration and the soft outer cover provides the desirable ball control. It has been found that this ionomer layer can be detrimental to golf ball properties, such as ball speed. Additionally, U.S. Pat. No. 5,875,891 discloses an impermeable packaging for golf balls. The impermeable packaging acts as a moisture barrier to limit moisture absorption by golf balls during storage, but not during use.

Also, high-temperature curing of certain polymeric materials to form the water vapor barrier layer or other outer layers on the golf ball is difficult to accomplish, since such curing or crosslinking heats the entire golf ball subassembly. This heating method may degrade the untargeted components or layers within the subassembly. Additionally, this curing method limits suitable outer layer materials to materials having a cured temperature that is lower than the softening temperature or lower melting temperature of the inner layers or core.

Hence, there remains a need for a golf ball with an improved moisture vapor barrier layer and improved methods for applying a moisture vapor barrier layer.

SUMMARY OF THE INVENTION

The present invention comprises a golf ball comprising an outer cover layer encasing a subassembly. The subassembly comprises a barrier layer encasing a core, wherein the barrier layer is formed from a composition comprising graphene. In one embodiment, the graphene comprises a precursor to graphene. In another embodiment, the graphene comprises a graphene oxide. In yet another embodiment, the graphene comprises reduced graphene oxide. Preferably, the composition forms a tortuous path against moisture vapor encroachment. In another embodiment, the subassembly has a Shore D hardness of less than about 60.

In yet another embodiment, the barrier layer has a first moisture vapor transmission rate and the cover has a second moisture vapor transmission rate. The first moisture vapor transmission rate is less than the second. Preferably, the first moisture vapor transmission rate is less than about $10^{-1}$ grams·mm/m$^2$·day at 38° C. and 90% relative humidity.

In one embodiment, the barrier layer is formed immediately about the core. In another embodiment, the barrier layer is disposed between the core and the cover layer. In another yet another embodiment, the barrier layer is disposed about the cover layer. Preferably, the barrier layer has a thickness of about 0.2 to 3 nanometers. More preferably, the barrier layer has a thickness of about 0.3 to 2 nanometers.

In one embodiment, the core is a solid core having a diameter of at least about 1.5 inch. Preferably, the solid core has a diameter of at least about 1.55 inches. In another embodiment, the cover layer has a thickness of about 0.010 inches to about 0.080 inches.

According to a method of providing a barrier layer in a golf ball, the golf ball comprises an outer cover layer encasing a subassembly. The subassembly comprises the barrier layer encasing a golf ball component having a core. The barrier layer is formed according to the following method: forming an aqueous solution containing graphene; coating the golf ball component in the aqueous solution; and allowing the solvent to evaporate. Preferably, the step of forming the aqueous solution containing graphene further comprises the steps of: oxidizing graphite to graphite oxide; exfoliating the graphite oxide in water by sonication to obtain graphite oxide colloids; and converting graphene oxide colloids to conducting graphite colloids through deoxygenation by solvent reduction. Preferably, the solvent is hydrazine.

BRIEF DESCRIPTION OF THE DRAWINGS

The accompanying drawings form a part of the specification and are to be read in conjunction therewith. The illustrated embodiments, however, are merely examples and are

DETAILED DESCRIPTION OF THE PREFERRED EMBODIMENTS

Broadly, the present invention is directed to a golf ball comprising a thin moisture vapor barrier ("MVB") layer. The ball may be a two-piece, multi-layer, or wound ball having cores, intermediate layers, covers and/or coatings comprising a thin MVB layer of the type disclosed herein. The ball may also be a one-piece ball having a homogenous core and a coating comprising the thin MVB layer.

A "cover" or a "core" as these terms are used herein includes a structure comprising either a single mass or one with two or more layers. As used herein, a core described as comprising a single mass means a unitary or one-piece core. The layer thus includes the entire core from the center of the core to its outer periphery. A core, whether formed from a single mass, two or more layers, or a liquid center may serve as a center for a wound ball. An intermediate layer may be incorporated, for example, with a single layer or multi-layer cover, with a single mass or multi-layer core, with both a single layer cover and core, or with both a multi-layer cover and a multi-layer core. A layer may additionally be composed of a tensioned elastomeric material. Intermediate layers of the type described above are sometimes referred to in the art, and, thus, herein as well, as an inner cover layer, as an outer core layer, or as a mantle layer.

Figure 1:
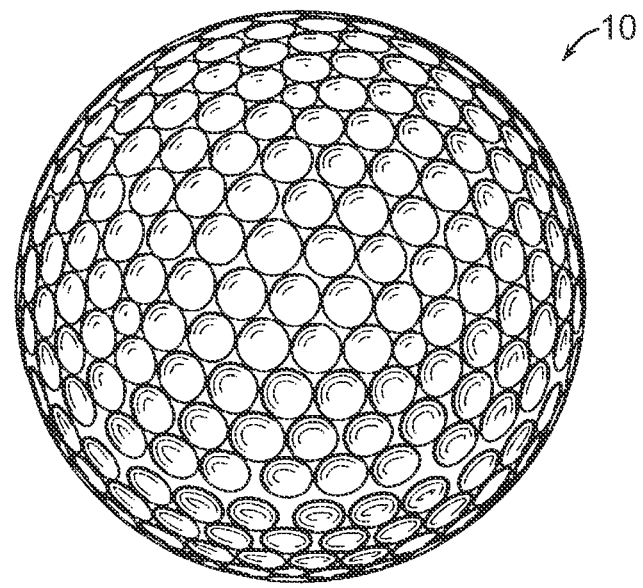
FIG. 1 is a front view of a dimpled golf ball in accordance to the present invention.
Figure 2:
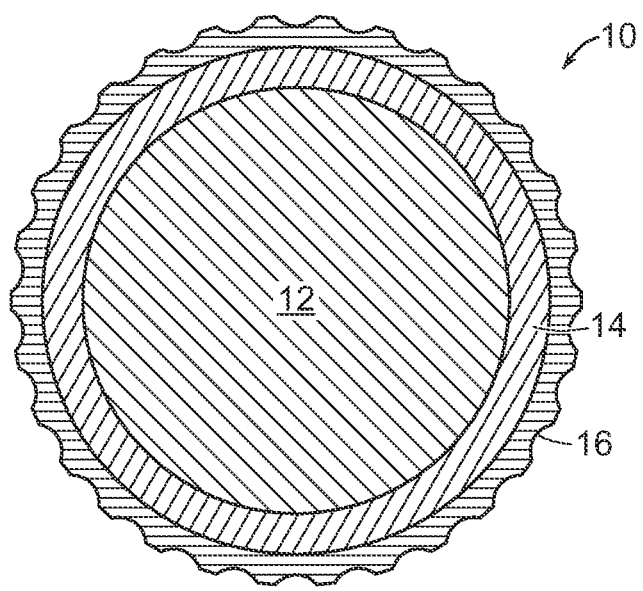
FIG. 2 is a cross-sectional view of the golf ball in FIG. 1 showing a solid core surrounded by a thin moisture vapor barrier layer and a cover.

As shown generally in FIGS. 1 and 2 reference number 10 broadly designates a golf ball in accordance to the present invention. Golf ball 10 preferably has a solid core 12, a moisture vapor barrier (MVB) layer 14 and a cover 16. Solid core 12 may comprise a single spherical element, or it may comprise a spherical element with one or more intermediate layers surrounding the spherical element. Solid core 12 can be made from any suitable core materials including thermoset plastics, such as natural rubber, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E.I. Du Pont de Nemours and Company, various manufacturers, and Shell Chemical Company, respectively. The core materials can also be formed from a castable material. Suitable castable materials include those comprising a urethane, polyurea, epoxy, silicone, IPN's, etc.

Additionally, suitable core materials may also include a reaction injection molded polyurethane or polyurea, including those versions referred to as nucleated, where a gas, typically nitrogen, is incorporated via intensive agitation or mixing into at least one component of the polyurethane, typically, the pre-polymer, prior to component injection into a closed mold where essentially full reaction takes place resulting in a cured polymer having reduced specific gravity. These materials are referred to as reaction injection molded (RIM) materials. Alternatively, the core may have a liquid center.

Cover 16 is preferably tough, cut-resistant, and selected from conventional materials used as golf ball covers based on the desired performance characteristics. The cover 16 may comprise one or more layers. Suitable cover materials include ionomer resins, such as Surlyn® available from DuPont, blends of ionomer resins, thermoplastic or thermoset urethane, acrylic acid, methacrylic acid, thermoplastic rubber polymers consisting of block copolymers in which the elastomeric midblock of the molecule is an unsaturated rubber or a saturated olefin rubber, e.g., Kraton® rubbers available from Shell Chemical Co., polyethylene, and synthetic or natural vulcanized rubber such as balata.

Additionally, other suitable core and cover materials are disclosed in U.S. Pat. No. 5,919,100 and international publications WO 00/23519 and WO 01/29129. These disclosures are incorporated by reference in their entirety. Preferably, core 12 is made from a polybutadiene rubber material and cover 16 is made from a composition comprising a thermoset or thermoplastic urethane or a composition comprising an ionomer resin.

Preferably, the MVB layer 14 comprises graphene. Graphene is a single-atomic-layer honeycomb lattice of carbon atoms in a $sp^2$ hexagonal bonding configuration. Lateral dimensions are of tens of nanometers to microns, and the thickness is at the atomic scale (Angstrom scale, where 1 Angstrom=0.1 nm). Graphene is known as the strongest material ever measured, with a Young's modulus of 1 TPa. Ideally, defect-free, single-crystalline, monolayer graphene has not only excellent mechanical properties and high transparency, but is also gas-impermeable. The gas impermeability of graphene results from its unique 2D, atomic-level honeycomb crystal structure. The electron density of aromatic rings in graphene is high enough to repel the penetration of atoms or molecules. For instance, when a monoatomic molecule, such as He, approaches the center of a carbon ring in a nondefective graphene monolayer, the energy barrier is about 18.8 eV with the local density approximation. The kinetic energy of the He atom (18.6 eV) was smaller than the energy barrier for penetration. Therefore, a defect-free, single-crystalline graphene monolayer can act as an excellent barrier against gas transport at room temperature. The electron density of aromatic rings in graphene is high enough to repel the penetration of atoms or molecules, including various gases like He, $H_2$, $CO_2$, $O_2$, $N_2$, $CH_4$, and $H_2O$.

Moreover, the pore diameter of the carbon ring in terms of the electronic density is smaller than the kinetic diameter of various gases, such as He (2.6 Angstroms), $H_2$ (2.89 A), $CO_2$ (3.3 A), $O_2$ (3.46 A), $N_2$ (3.64 A), $CH_4$ (3.8 A). The pre-diameter of an octagon ring (considering electron density) is only 1.5 A. Only large vacancies with a size above 5 A, that is two lattice parameters, can be penetrated by gas molecules. Thus, graphene is an excellent MVB layer material.

It has not been easy to synthesize large-area, defect free graphene sheets because there are some defects due to graphene boundaries, point defects, and carbon rings with more or less than six carbon atoms. Freestanding graphene can be prepared by the mechanical exfoliation of graphene on the micro-scale with etching, photolithography from epitaxial growth, and the chemical vapor deposition (CVD) growth of graphene. Defective graphene can also be used for barrier film applications through the stacking of a number of graphene sheets.

Technical limitations of the scale-up of graphene production can also be addressed by using a precursor of graphene, graphite and/or graphene oxide. Graphene oxide (GO) is the oxidated form of graphene, consisting of oxygen functional groups on the basal plane and at the edges. GO is approximately 1 to 1.3 nanometers thicker than that of monolayer graphene (0.34 nm). GO can be a precursor of graphene via chemical or thermal reduction methods or other suitable reduction methods. Oxygen-containing functional groups in GO are mostly eliminated by reduction processes to create a reduced form of graphene oxide (rGO) that mimics the properties of graphene. In general, there are various reduction methods, such as high-temperature thermal reduction, low-temperature chemical reduction, and irradiation-assisted reduction. Preferably, the low-temperature chemical reduction or irradiation-assisted reduction are used. Typically, some oxygen groups remain on the surface after the reduction process.

Graphene oxide can be dispersed into aqueous polar solvents (i.e. water) due to its hydrophilic nature. Thin GO films can be prepared with the Langmuir-Blodgett, drop-casting, dip-coating, spraying, electrophoresis, vacuum-filtration and spin-coating methods. Spraying and dip-coating techniques are the preferred methods for making GO films. It will be appreciated that these techniques may result in a non-uniform deposition due to self-aggregation of the graphene oxide. The thickness of the film may be controlled via GO concentration adjustment and by the number of coating cycles.

A layer-by-layer (LBL) self-assembly on polymers is a useful method for preparing barrier GO/polymer films. Using LBL self-assembly, nanometer thick GO layers can be achieved by the adsorption of oppositely charged polyelectrolytes on a polymeric substrate. GO has negative charges on the surfaces; therefore, GO can be used to form a thin barrier film with polycations with LBL deposition.

Exfoliated graphite oxide (graphene oxide) can form well-dispersed aqueous colloids. The formation of stable GO colloids can actually be attributed to electrostatic repulsion, rather than just the hydrophilicity of GO. Reduction of the graphene oxide colloids enables a solution containing stable well-dispersed chemically converted graphene (or "reduced") colloids to be produced. The electrostatic repulsion mechanism that enables stable graphene oxide colloids is the same reason graphene colloids are stable as well.

In order to use graphene as a MVB layer 14, different strategies for manufacture have to be used. The MVB layer may be formed as a layer on a golf ball component. A golf ball component may be any suitable part of a golf ball, for example a core, a multi-layer core, a core and an intermediate layer, a core and a cover layer, and a core, an intermediate layer and a cover layer. One strategy to apply a layer with graphene to a golf ball component may be the dispersion of graphene in an aqueous solution. A solution containing graphene colloids may be synthesized as follows: 1) oxidation of graphite to graphite oxide; 2) exfoliation of graphite oxide in water by sonication to obtain GO colloids that are stabilized by electrostatic repulsion; and 3) controlled conversion of GO colloids to conducting graphene colloids through deoxygenation by solvent reduction. This solution may then be used to form a thin film on a golf ball component by coating the golf ball component with the solution from step (3), and allowing the solvent to evaporate. Once dried, a thin, water resistant graphene film will be coating the golf ball component. It will be appreciated that the step of coating may be done by submersion, spraying or any other suitable method to coat the golf ball component with the solution. It will also be appreciated that the coating or thin film may comprise at least one layer coated on the golf ball component, preferably 1 to 6 layers, more preferably 1 to 3 layers. Hydrazine is the preferred solvent for solvent reduction, although it will be appreciated that other suitable solvents may be used. Like many other lyophobic colloids, once the graphene colloids are dried, they are not redispersible in water, rendering as-prepared graphene coatings water-resistant.

Of particular significance is that, owing to the high aspect ratio of the graphene sheets, a very thin graphene coating can result in the formation of a continuous conducting network. For example, it will be appreciated that the graphene in the MVB layer may be incorporated into any electronic device or circuitry for the golf ball. For example, it is known to incorporate electronic devices into a golf ball, such as organic light emitting diode displays, devices for locating the golf ball or devices to measure the golf ball flight properties. These incorporated devices may take advantage of the conducting properties of graphene in a MVB layer to further improve on their use in golf balls. The very thin graphene coating is also transparent with at least a 96% transmittance of visible light. Thus, it will be appreciated that graphene may be deposited on a golf ball component by 1) depositing GO on ball layer and then reducing or 2) depositing rGO on ball layer and waiting for solvent to evaporate.

Figure 3:
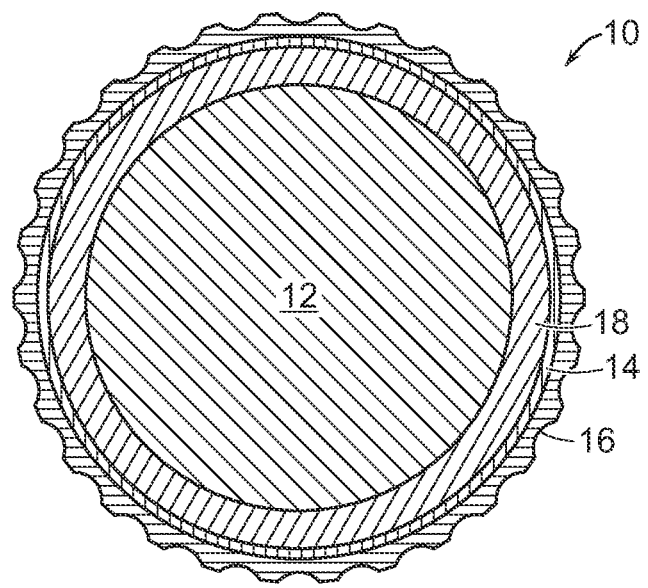
FIG. 3 is a cross-sectional view of the golf ball of FIG. 1 showing a solid core surrounded by a thin moisture vapor barrier layer, an intermediate layer and a cover.

In accordance to another aspect of the invention, as shown in FIG. 3, the thin MVB layer 14 comprising the graphene disclosed herein can be applied to any and all golf ball constructions to minimize moisture vapor influx. The golf ball construction may comprise at least one intermediate layer 18 disposed between the core 12 and the cover 16. One or more of the thin MVB layers 14 may be disposed between the core 12 and the cover 16. Preferably, a first thin MVB layer 14 is disposed immediately around the core 12. Optionally, a second thin MVB layer 14 may be disposed between the intermediate layer 18 and the cover 16, preferably immediately about the intermediate layer 18. Application of multiple thin MVB layers 14 is especially beneficial when one or more of golf ball component layers or the innermost core center are made from a rubber or polybutadiene material or from other materials that are adversely affected by water vapor. Advantageously, each thin MVB layer 14 protects a preselected portion of the golf ball, such that if moisture vapor penetrates an outer thin MVB layer 14, the interior layers remain protected by the inner thin MVB layers 14. The compositions of each thin MVB layer 14 may be the same or different from each other, and may or may not comprise a graphene-based layer. Preferably, at least one of the thin MVB layers 14 comprises graphene.

Figure 4:
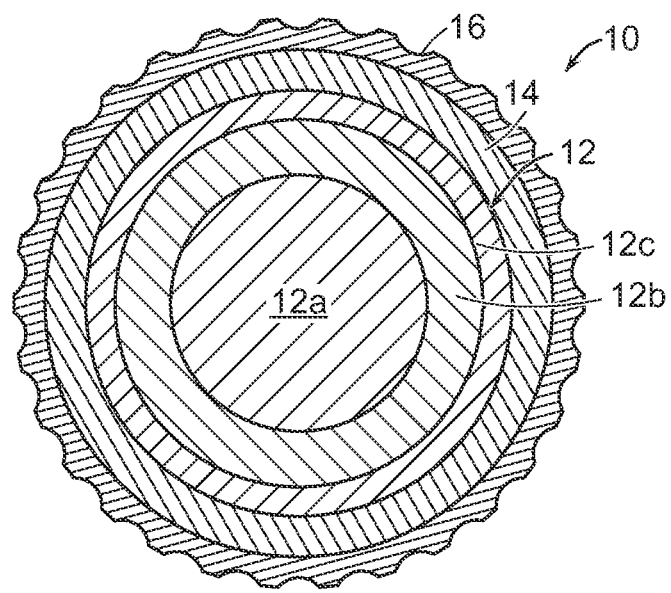
FIG. 4 is a cross-sectional view of another golf ball in accordance to the present invention showing a solid dual core surrounded by a thin moisture vapor barrier layer and a cover.

In a further embodiment of the invention shown in FIG. 4, the graphene-based thin MVB layer 14 is used in a golf ball 10 with a multi-layer core 12 construction to minimize the transmission of moisture vapor to any part of the multi-layer core 12 having layers 12a, 12b and 12c. As shown, the golf ball construction has a core 12 comprising a center 12a and at least two outer core layers 12b and 12c. The thin MVB layer 14, comprising graphene as discussed above, encases the core 12 immediately adjacent to outer core layer 12c. The cover 16 may comprise a single layer or a multi-layer structure having at least one inner cover layer and at least one outer cover layer.

In a preferred embodiment, the golf ball comprises a dual-core construction with a core 12 having a center 12a and an outer core layer 12b. The center 12a may have an outer diameter from about 0.75 inches to about 1.25 inches, and the outer core layer 12b may have a thickness of from about 0.01 inches to about 0.50 inches. The MVB layer 14, comprising graphene as discussed above, encases the core 12 immediately adjacent the outer core layer 12b. The cover 16 may comprise a single layer, or a multi-layer structure having at least one inner cover layer and at least one outer cover layer. Preferably, the cover 16 is a double-cover having an inner cover layer and an outer cover layer. Optionally, the golf ball construction may further comprise at least one intermediate layer 18 disposed between the core and the cover. Variations of the dual-core, double-cover construction and suitable materials for each layer are described in U.S. Pat. Nos. 6,913,547, 6,635,716, and 6,849,006, the disclosures of which are incorporated herein by reference in their entirety.

Figure 5:
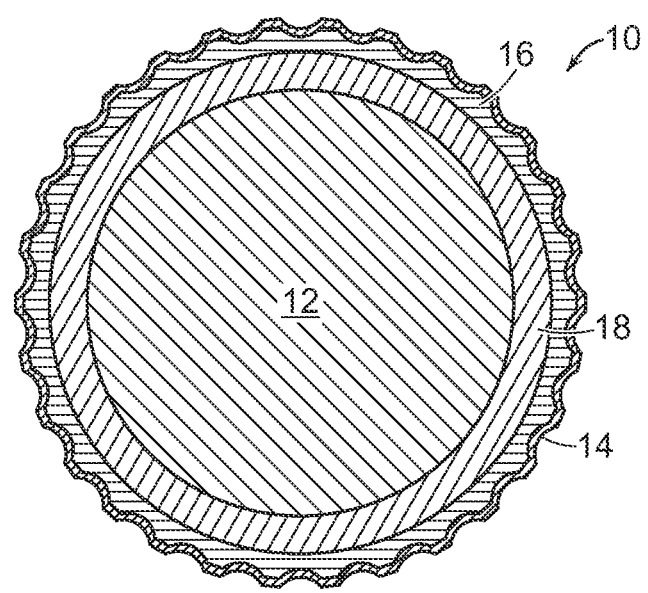
FIG. 5 is a cross-sectional view of another golf ball in accordance to the present invention showing a solid core surrounded by an intermediate layer, a cover and a thin moisture vapor barrier layer.

In accordance to another aspect of the invention, as shown in FIG. 5, the thin MVB layer 14 comprising the graphene disclosed herein can be applied as a top coating about the cover 16. The golf ball construction may comprise a core 12, at least one intermediate layer 18 disposed between the core 12 and the cover 16. One or more of the thin MVB layers 14 may be disposed about the cover 16 to form a top coating. Advantageously, in this embodiment the MVB layer 14 protects the entire golf ball 10 to prevent moisture penetration. As discussed above, the graphene coating is transparent with at least a 96% transmittance of visible light. Thus, the material makes an ideal MVB layer top coating 14 for a golf ball 10.

The graphene-based MVB layer 14 may further serve to prevent water vapor from exiting the golf ball 10, particularly when the ball 10 comprises a fluid-filled core 12. Suitable fluids for the fluid-filled cores include without limitation air, aqueous solutions, liquids, gels, foams, hot-melts, other fluid materials and combinations thereof. Preferred fluids include water, oils, glycol, solutions such as salt water and corn syrup, and mixtures thereof. The fluids can further include pastes, as well as colloidal suspensions such as clay and barytes. Examples of suitable gels include water gelatin gels, hydrogels, water/methyl-cellulose gels, and gels comprised of copolymer rubber based materials such a styrene-butadiene-styrene rubber and paraffinic and/or naphthenic oil. Examples of suitable melts include waxes and hot melts. Hot-melts are materials, which at or about normal room temperatures are solid but at elevated temperatures become liquid. A high melting temperature is desirable since the liquid core is heated to high temperatures during the molding of the core center, the outer core layer, and the cover. Alternatively, suitable fluids also include low specific gravity fluids such as SAE 10 oil, SAE 30 oil, methanol, ethanol, ammonia, etc., or high specific gravity fluids such as glycerin and carbon tetrachloride.

To prevent or minimize the penetration of moisture, typically water vapor, into core 12 of golf ball 10, a MVB layer 14 is preferably disposed around core 12. Preferably, MVB layer 14 has a moisture vapor transmission rate that is lower than that of the cover. More preferably, the MVB layer 14 has a moisture vapor transmission rate less than the moisture vapor transmission rate of an ionomer resin such as Surlyn® which is in the range of about 0.45 to about 0.95 grams·mm/m²·day. Typically, the moisture vapor transmission rate of ionomer resin is less than 0.6 grams·mm/m²·day as reported in "Permeability and other Film Properties of Plastics and Elastomer" published by the Plastic Design Library (1995). The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-94 entitled "Standard Test Method for Water Vapor Transmission Rate of Flexible Barrier Materials Using an Infrared Detection Technique," among others. The moisture vapor transmission rate of graphene is estimated to be less than about $10^{-1}$ grams·mm/m²·day 38° C. and 90% relative humidity.

In accordance to one aspect of the invention, the Shore D hardness values for the core 12 and MVB layer 14 subassembly are less than about 60 and more specifically in the range of about 5-50.

Preferably, the MVB layer is a thin layer or layers of suitable graphene discussed above, preferably with a thickness of about 0.2 to 3 nanometers, more preferably 0.3 to 2 nanometers. It is also preferable that the MVB layer 14 would not significantly and negatively affect the coefficient of restitution (CoR) of the golf ball, maintaining a COR of at least 0.79 for the golf ball component containing the MVB layer 14. Preferably, the polybutadiene core 12 and the thin MVB layer 14 are covered by a relatively soft polymer cover having a thickness from about 0.010 to about 0.050 inch, more preferably about 0.030 inch and has a Shore D of less than 65 or from about 30 to about 60, more preferably from about 35 to about 50 and even more preferably about 40 to about 45. Such a cover is fully disclosed in U.S. Pat. Nos. 5,885,172 and 6,132,324. The disclosures of these two patents are incorporated herein by reference in their entireties.

In one embodiment, a golf ball in accordance with the present invention comprises a solid or multiple-layer solid polybutadiene core 12 having an outer diameter of greater than about 1.53 inches, more preferably greater than 1.58 inches and most preferably about 1.62 inches. The core has a compression of about 65-75, preferably about 70. MVB layer 14 is a thin layer or layers comprising graphene as discussed above and has a thickness preferably in the range of about 0.2 to 3 nanometers, more preferably 0.3 to 2 nanometers. Cover 16 is a urethane cover with sufficient thickness to produce a 1.680 inch diameter golf ball. The golf ball has a ball compression of about 85-95, preferably about 87.

In another embodiment, a golf ball in accordance with the present invention comprises a solid or multiple-layer solid polybutadiene core 12 having an outer diameter of greater than about 1.5 inches, more preferably greater than 1.55 inches and most preferably about 1.62 inches. The core has a compression of about 45-55, preferably about 49. MVB layer 14 is a thin layer or layers comprising graphene as discussed above and has a thickness preferably in the range of about 0.2 to 3 nanometers, more preferably 0.3 to 2 nanometers. Cover 16 is a urethane cover with sufficient thickness to produce a 1.680 inch diameter golf ball. The golf ball has a ball compression of about 70-80, preferably about 77.

In another embodiment, golf ball 10 may have a dual core 12 with layers 12a and 12b, surrounded by MVB layer 14 and cover 16. Core layer 12b may be an integral solid layer or discrete layers molded on each other. Alternatively, outer core layer 12b could be a wound layer or layers and the innermost core 12a may be liquid-filled. In another embodiment, a golf ball in accordance to the present invention comprises a solid or multiple-layer solid polybutadiene core 12 having layers 12a and 12b. The dual core 12 has an outer diameter of greater than about 1.55 inches, more preferably greater than 1.58 inches and most preferably about 1.62 inches. The core has core compression of about 85-95, preferably about 88. MVB layer 14 is a thin layer or layers of graphene discussed above and has a thickness preferably in the range of about 0.2 to 3 nanometers, more preferably 0.3 to 2 nanometers. Cover 16 is a urethane cover with sufficient thickness to produce a 1.680 inch diameter golf ball. The golf ball has a ball compression of about 95-105, preferably about 100.

It will be appreciated that the present invention is not limited to any particular dimple pattern. The present invention may have an arrangement based on any polyhedra such as octahedra, dodecahedra, cuboctahedra or dipyramids, or to non-polyhedron based arrangement schemes such as phyllotaxis or random arrangements. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference.

Other than in the operating examples, or unless otherwise expressly specified, all of the numerical ranges, amounts, values and percentages in the specification may be read as if prefaced by the word "about" even though the term "about" may not expressly appear with the value, amount, or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

In describing the present technology, the following terminology may have been used: The singular forms "a," "an," and "the" include plural referents unless the context clearly dictates otherwise. Thus, for example, reference to an item includes reference to one or more items. The term "plurality" refers to two or more of an item. The terms "substantially" or "about" mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. When numerical lower limits and numerical upper limits are set forth herein, it is contemplated that any combination of these values may be used. A plurality of items may be presented in a common list for convenience. However, these lists should be construed as though each member of the list is individually identified as a separate and unique member. Thus, no individual member of such list should be construed as a de facto equivalent of any other member of the same lists solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to a selection of one of two or more alternatives, and is not intended to limit the selection of only those listed alternative or to only one of the listed alternatives at a time, unless the context clearly indicated otherwise.

All patents, publications, test procedures, and other references cited herein, including priority documents, are fully incorporated by reference to the extent such disclosure is not inconsistent with this invention and for all jurisdictions in which such incorporation is permitted.

While various descriptions of the present invention are described above, it is understood that the various features of the present invention can be used singly or in combination thereof. Therefore, this invention is not to be limited to the specifically preferred embodiments depicted therein.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

I claim:

1. A golf ball comprising an outer cover layer encasing a subassembly, the subassembly comprising a barrier layer encasing a core, wherein the barrier layer is formed from a composition comprising graphene, wherein the barrier layer has a thickness of about 0.2 to 3 nanometers.

2. The golf ball of claim 1, wherein the composition forms a tortuous path against moisture vapor encroachment.

3. The golf ball of claim 1, wherein the subassembly has a Shore D hardness of less than about 60.

4. The golf ball of claim 1, wherein the barrier layer has a first moisture vapor transmission rate, the cover has a second moisture vapor transmission rate, and wherein the first moisture vapor transmission rate is less than the second.

5. The golf ball of claim 1, wherein the first moisture vapor transmission rate is less than about $10^{-1}$ grams·mm/m²·day at 38° C. and 90% relative humidity.

6. The golf ball of claim 1, wherein the barrier layer is disposed immediately about the core.

7. The golf ball of claim 1, wherein the barrier layer is disposed between the core and the cover layer.

8. The golf ball of claim 1, wherein the barrier layer has a thickness of about 0.3 to 2 nanometers.

9. The golf ball of claim 1, wherein the core is a solid core having a diameter of at least about 1.5 inch.

10. The golf ball of claim 9, wherein the solid core has a diameter of at least about 1.55 inches.

11. The golf ball of claim 1, wherein the cover layer has a thickness of about 0.010 inches to about 0.080 inches.

12. A golf ball comprising an outer cover layer encasing a subassembly, the subassembly comprising a core, and a barrier layer disposed about the cover layer, wherein the barrier layer is formed from a composition comprising graphene, wherein the barrier layer has a thickness of about 0.2 to 3 nanometers.

13. The golf ball of claim 12, wherein the barrier layer has a thickness of about 0.3 to 2 nanometers.

14. A method of providing a barrier layer in a golf ball, the golf ball comprising an outer cover layer encasing a subassembly comprising the barrier layer encasing a golf ball component having a core, wherein the barrier layer is formed according to the following method:
   forming an aqueous solution containing graphene;
   coating the golf ball component in the aqueous solution; and
   allowing the solvent to evaporate.

15. The method of claim 14, wherein the step of forming the aqueous solution containing graphene further comprises the steps of:
   oxidizing graphite to graphite oxide;
   exfoliating the graphite oxide in water by sonication to obtain graphene oxide colloids; and
   converting graphene oxide colloids to conducting graphene colloids through deoxygenation by solvent reduction.

16. The method of claim 15, wherein the solvent is hydrazine.

\* \* \* \* \*